United States Patent [19]

Du

[11] Patent Number: 4,467,941

[45] Date of Patent: Aug. 28, 1984

[54] APPARATUS AND METHOD FOR DISPENSING BEVERAGE SYRUP

[76] Inventor: Benjamin R. Du, 32392 Via Antibs, South Laguna, Calif. 92677

[21] Appl. No.: 431,175

[22] Filed: Sep. 30, 1982

[51] Int. Cl.³ .............................................. G01F 11/08

[52] U.S. Cl. ........................................... 222/1; 222/66

[58] Field of Search ....................... 137/113, 399, 565; 417/38, 1, 44, 40; 222/52, 53, 66, 67, 1

[56] References Cited

U.S. PATENT DOCUMENTS

| | | | |
|---|---|---|---|
| 2,955,173 | 10/1960 | Kranz | 417/40 X |
| 3,351,238 | 11/1967 | Gilbertson | 222/66 X |
| 4,247,018 | 1/1981 | Credle | 137/113 X |

*Primary Examiner*—Stanley H. Tollberg
*Attorney, Agent, or Firm*—Hubbard & Stetina

[57] ABSTRACT

An improved apparatus and method for dispensing beverage syrup is disclosed characterized by use of a low flow rate, positive displacement pump adapted to accurately deliver syrup from a collapsible bag/box syrup container to a dispensing nozzle. Air ingestion into the dispensing system is eliminated by use of a novel air trap/filter adapted to generate a high vacuum signal at the intake port of the pump in response to detecting the presence of air or encountering a syrup depletion condition which signal automatically discontinues pump operation. A vacuum actuated diverter valve is additionally incorporated into the dispensing system to permit the intake port of the pump to be automatically placed in flow communication with differing syrup containers, thereby allowing continuous syrup dispensing operation even during replacement of spent syrup containers.

17 Claims, 10 Drawing Figures

APPARATUS AND METHOD FOR DISPENSING BEVERAGE SYRUP

BACKGROUND OF THE PRESENT INVENTION

The present invention relates to pumping and dispensing systems and, more particularly, to an improved apparatus and method for dispensing syrup such as that used in carbonated beverages.

As is well known, a variety of beverages are marketed to retail consumers by dispensing systems which simultaneously deliver a metered quantity of flavored syrup with a proportional quantity of carbonated water or the like. For sanitation and economy concerns, the beverage industry has recently begun supplying these flavored syrups in collapsible bag/box containers which are adapted to be connected to suitable prior art dispensing systems.

The majority of the prior art dispensing systems have utilized a low flow rate pump for drawing the syrup from the bag container and supplying a metered quantity of the syrup to a mixing nozzle. The use of such low flow rate pumps has been advantageous for system reliability concerns as well as due to such syrups being highly concentrated and thereby being mixed with relatively large volumes of carbonated water and the like. Although such prior art dispensing systems have proven generally suitable for their intended purpose, they have possessed inherent deficiencies which have detracted from their overall effectiveness in the trade.

Foremost of these deficiencies has been the inability of the prior art dispensing systems to eliminate the ingestion of air into the pump of the dispensing system, which air ingestion typically occurs upon encountering a syrup depletion condition within the syrup bag container. As will be recognized, air ingestion into the dispensing system necessarily introduces inaccuracy in the quantity of dispensed syrup and thus adversely affects the quality of the resultant beverage; and in extreme instances, causes overheating and permanent damage to the pump of the dispensing system. Although these air ingestion deficiencies have been recognized to a limited extent in the art, the solutions to date have typically been ineffective.

In addition, the prior art dispensing systems have heretofore failed to provide suitable means to permit the rapid replacement of spent syrup bag containers into the system. As such, operators have heretofore typically been required to either temporarily discontinue the dispensing operation when replacing bag containers or have been required to connect multiple syrup bags in a series flow configuration in an attempt to alleviate the occurrence of a syrup depletion condition. Such temporary discontinuance of the dispensing operation has necessarily been economically inconvenient to operators and further increases the chances of ingesting air into the system. In addition, the series flow connection techniques prevent the complete turnover of fresh syrup inventory in that one of the syrup bags in the series connection never completely depletes its entire quantity of syrup.

Thus, there exists a substantial need in the art for an improved apparatus and method for dispensing syrup which utilizes a low flow rate pump suited for proper dispensing of syrup through a nozzle, eliminates air ingestion into the dispensing system, and permits multiple syrup bag/box containers to be completely utilized and replaced without temporary discontinuance of the dispensing operation.

SUMMARY OF THE PRESENT INVENTION

The present invention specifically addresses and alleviates the above-referenced need associated in the art. More particularly, the present invention incorporates a low flow rate positive displacement pump which is adapted to accurately deliver beverage syrup from a collapsible bag/box syrup container to a dispensing nozzle. A novel air trap/filter is installed between the syrup container and the intake port of the pump which serves to eliminate ingestion of air into the pump. In operation, the air trap/filter generates a high vacuum signal at the intake port of the pump upon detecting the presence of air in the air trap/filter or encountering a syrup depletion condition within the syrup bag container. The high vacuum signal is sensed by a vacuum switch which controls pump operation to automatically discontinue the pumping operation and thereby prevent improper syrup metering and/or overheat damage to the pump.

In addition, the present invention incorporates a unique diverter valve installed between the air trap/filter and intake port of the pump which enables the automatic switching between plural syrup bag containers and thereby eliminates the temporary discontinuance of the dispensing operation during replacement of spent syrup bag containers. In the preferred embodiment, the diverter valve is connected between a pair of syrup bag containers and includes a valving member operative to automatically shift between a pair of valve seats, each of which communicates with a respective one of the pair of syrup bag containers. The valving member is pressure actuated and is biased by an over center latching spring/diaphragm assembly which serves to insure that the valving member is continuously seated against a respective one of the valve seats except during an instaneous actuation period of the valving member. As such, the present invention permits the automatic switching between syrup bag containers while insuring against air ingestion into the system.

In addition, the present invention incorporates means to automatically discontinue pump operation when both of the pair of syrup bag containers are deplenished to insure against pump overheating and air ingestion into the system.

DESCRIPTION OF THE DRAWINGS

These as well as other features of the present invention will become more apparent upon reference to the drawings wherein.

DETAILED DESCRIPTION OF THE PREFERRED EMBODIMENT

Figure 1:
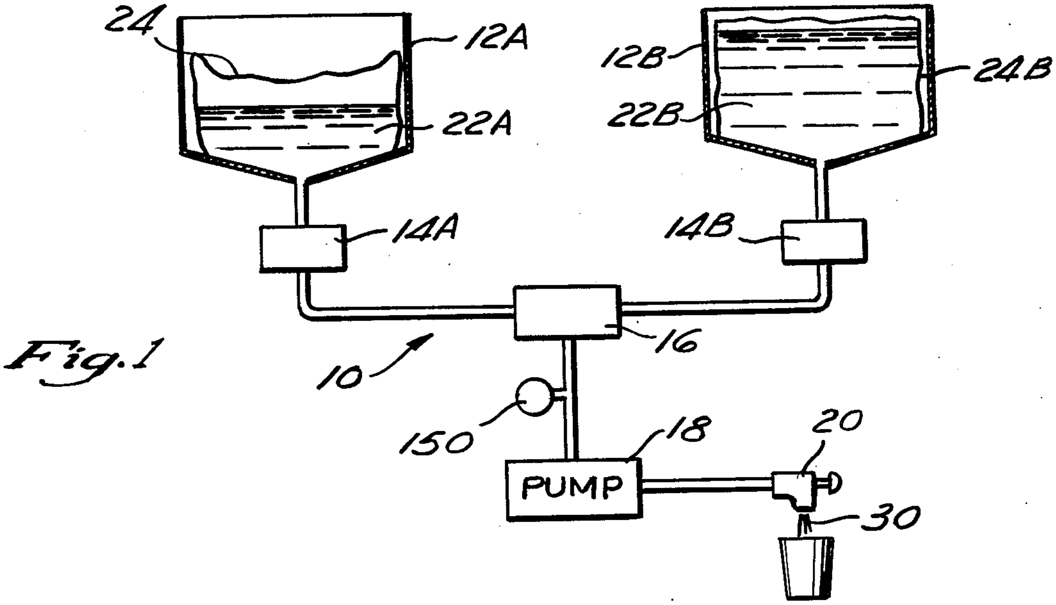
FIG. 1 is a schematic view of the improved apparatus of the present invention depicting a pair of collapsible bag syrup containers, a pair of air traps/filters, a diverter valve, a pump, and a dispensing nozzle.

Referring to FIG. 1, there is shown a schematic representation of the improved apparatus 10 of the present invention for dispensing beverage syrup composed generally of a pair of syrup storage reservoirs 12A and 12B, a pair of air trap filter devices 14A and 14B, a diverter valve 16, pump 18, and dispensing nozzle 20. In the preferred embodiment, each of the storage reservoirs 12A and 12B comprise a collapsible bag/box syrup container such as that currently utilized in the beverage trade and which store a quantity of flavored beverage syrup 22A and 22B, respectively. As is well known, as the syrup 22A and 22B is removed from the containers 12A and 12B respectively during dispensing, the collapsible bags 24A and 24B collapse downward toward the lowermost end of the containers 12A and 12B with any air maintained in the bags 24A and 24B rising to the uppermost portion of the bags 24A and 24B.

As a basic operational overview, the improved apparatus 10 of the present invention permits the syrup 22A is a respective one of the collapsible bag reservoirs 20A to be drawn through a respective air trap/filter 12A and through the diverter valve 16 by suction created by the pump 18. The syrup is subsequently discharged through the mixing nozzle 20 wherein the syrup 22A is mixed with a proportional quantity of carbonated water or the like (i.e. a mixing fluid) to form the result beverage 30. When the quantity of syrup 22A maintained within the collapsible bag reservoir 22A is depleted or when air is sensed in the air trap/filter 14A, the diverter valve 16 functions to automatically discontinue syrup flow to the pump 18 from the reservoir 12A and initiate syrup flow from the syrup reservoir 12B to the pump 18 whereby continuous dispensing of the resultant product 30 may be accomplished. Although in the preferred embodiment, carbonated beverage syrup is utilized in the apparatus 10, it will be recognized that the present invention is additionally applicable to other dispensed beverages such as wine, tea, concentrates and fruit juices and for purposes of this application, the term "syrup" shall be defined to include such other food beverages.

Figure 2:
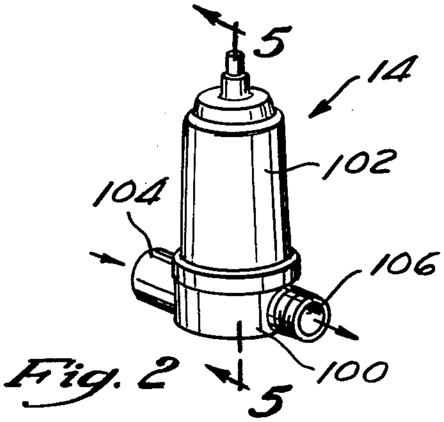
FIG. 2 is a perspective view of the air trap/filter of the present invention.
Figure 3:
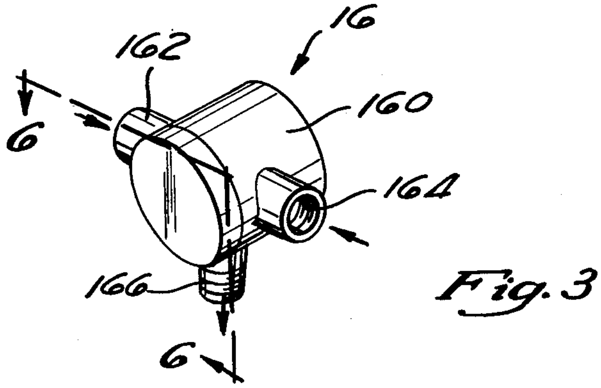
FIG. 3 is a perspective view of the diverter valve of the present invention.
Figure 4:
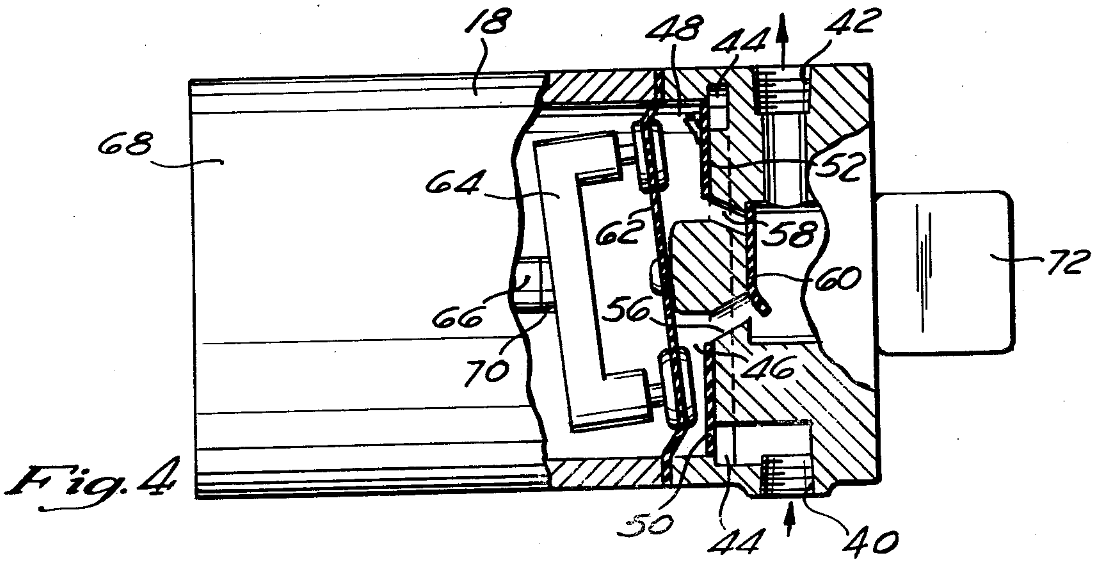
FIG. 4 is a partial cross-sectional view of the low flow rate positive displacement pump of the present invention.

Referring more particularly to FIGS. 2 through 7, the detailed construction and operation of the individual components, i.e. the pump 18, air trap filters 14A and 14B, and diverter valve 16, may be described. Although a variety of suitable pumps may be utilized in the apparatus 10 of the present invention, in the preferred embodiment, the pump 18 comprises a short stroke wobble plate pump specifically adapted to generate a relatively small discharge flow rate suitable for syrup dispensing applications. As best shown in FIG. 4, the pump 18 is provided with an inlet port 40 and an outlet port 42 which are in flow communication with the diverter valve 16 and mixing nozzle 20, respectively. The inlet port 40 communicates through an annular passageway 44 to a pair of pumping chambers 46 and 48. A pair of one-way check valves are provided between the annular flow passage 44 and pumping chambers 46 and 48 which in the preferred embodiment, comprise resilient flapper valves 50 and 52 adapted to permit flow communication between the inlet port 40 and the pumping chambers 46 and 48 only upon the intake stroke of the pump 18. The outlet port 42 of the pump 18 communicates with the pair of pumping chambers 46 and 48 through a pair of discharge passageways 56 and 58, respectively, which additionally are provided with a common one-way check valve 60 adapted to permit flow communication between the discharge passageways 56 and 58 and outlet port 42 only during the discharge stroke of the pump 18.

The rear walls of the pair of pumping chambers 46 and 48 are defined by a resilient diaphragm 62 which is anchored adjacent its midpoint and about its circumference to the housing of the pump 18. In the vicinity of the pair of pumping chambers 46 and 48, the diaphragm 62 is additionally connected to a wobble plate or linkage 64 which is driven by the output shaft 66 of a motor 68. An eccentric bearing 70 is utilized to journal the wobble plate 64 to the output shaft 66 whereby rotation of the output shaft 66 causes the wobble plate 64 to angularly reciprocate back and forth causing the volume of the pumping chambers 46 and 48 to be alternatively increased and decreased to thus, provide a pumping action.

FIG. 4 depicts the pump 18 in an operational mode wherein the pumping chamber 46 is shown at the end of its discharge stroke while the pumping chamber 48 is shown at the end of its intake stroke. As will be recognized, during the discharge stroke of the pumping chamber 46, fluid contained within the pumping chamber 46 is prevented from flow back into the intake port 40 of the pump 18 by way of the flapper valve 50 being maintained in a closed position while flow through the discharge passageway 56 to the outlet port 42 is permitted due to the opening of the one way flapper valve 60. Simultaneously, flow from the inlet port 40 into the pumping chamber 48 is facilitated through the intake passage 44 and opening of the flapper valve 52 while discharge of fluid from the pumping chamber 48 through the discharge chamber 58 is prohibited by the closed flapper valve 60.

During continued rotation of the pump motor 68, the wobble plate 64 will alternatively reciprocate causing the pumping chamber 48 to experience a discharge stroke while the pumping chamber 46 experiences an intake stroke in the manner previously described. As such, the pump 18 functions to provide a short stroke, low flow rate syrup discharge through the outlet port 42. In the preferred embodiment, a pressure switch 72 is additionally provided on the outlet port 42 to automatically shut off or discontinue the operation of the pump motor 68 upon encountering extremely high pressures within the outlet port 42, i.e. approximately 60 to 70 psi.

Although from operational and reliability considerations, a short stroke, low flow rate pump is preferred in syrup dispensing applications, it is characteristic of such pumps that the vacuum level developed at the intake port 40 of the pump 18 during normal fluid pumping conditions is of a relatively small magnitude, i.e. approximately 10 inches of mercury. Further, the vacuum level generated by the pump 18 upon encountering air at the inlet port 40 typically decreases to only a value of 6 to 8 inches of mercury. Due to this small vacuum differential existing between syrup pumping and air pumping conditions, the incorporation of a conventional pressure switch at the intake port of the pump to automatically turn off the pump 18 upon encountering an air pumping condition has proven to be ineffective and, hence, has caused pumping inaccuracies as well as heat damage to the pump 18. The present invention specifically addresses this deficiency associated in the art by way of inclusion of the air trap/filter 14A or 14B between the syrup reservoir 12A and 12B, respectively, and intake port 40 of the pump 18 which is adapted to generate a high magnitude vacuum signal in response to encountering a syrup depletion condition or air ingestion in the dispensing system.

Figure 5:
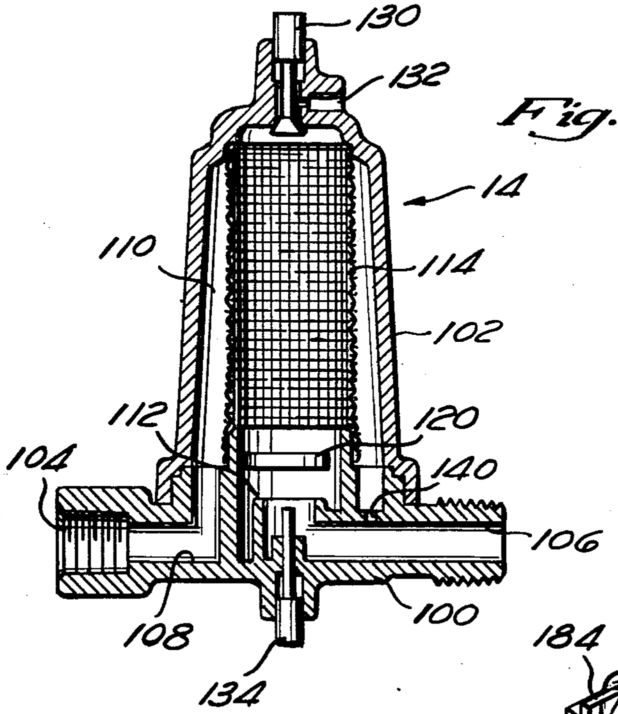
FIG. 5 is a cross-sectional view of the air trap/filter of the present invention taken about lines 5—5 of FIG. 2.

Referring particularly to FIGS. 2 and 5, the construction of the air trap/filters 14A and 14B is depicted. Since the construction and operation is identical for both of the air traps/filters 14A and 14B of the apparatus 10, the following description is made in reference to only a single air trap 14 which will be identical for both of the air traps 14A and 14B of the present invention. As shown, the air trap 14 is composed generally of a base member 100 and cap or bonnet 102 which are interconnected adjacent the lower end of the cap 102. The base member 100 includes an inlet port 104 and outlet port 106 which in the composite apparatus 10 of the prsent invention, are in flow communication with the syrup reservoirs 12A or 12B and the inlet port 40 of the pump 18, respectively. An inlet passage 108 extends from the inlet port 104 and communicates with the interior of the cap 102 which defines a filter chamber 110. The outlet port 106 of the air trap/filter 14 communicates with the filter chamber 110 through a valve seat 112 disposed centrally within the base member 100. A filter element 114 preferably formed of a wire mesh screen is positioned within the filter chamber 110 and is maintained coaxial with the valve seat 112 as by way of an annular flange 116 formed in the base member 100 and an annular recess 117 formed in the cap 102. A valving member 120 preferably formed as a disk or ball and having a specific gravity less than the syrup 22A or 22B, is disposed within the interior of the filter element 14 and is adapted to selectively cover and uncover the valve seat 112 in response to varying syrup levels within the filter chamber 110.

In operation, the air trap/filter 14 of the present invention continuously functions in a conventional filtering manner wherein debris carried by the syrup passing through the inlet port 104 is prevented from passage through the outlet port 106 by the filter element 114. During this filtering operation, the syrup level within the air trap/ filter 14 is maintained at an elevation vertically above the valve seat 112, whereby due to the disk 120 having a specific gravity less than the specific gravity of the syrup, the disk 120 floats upon the syrup and is maintained above the valve seat 112. As such, syrup is permitted to flow across the valve seat 112 and through the discharge port 106 of the air trap/filter 16 and to the pump 18. However, upon encountering the ingestion of air into the air trap/filter 14 or a syrup depletion condition within the syrup container 12A or 12B, the syrup level within the air trap/filter 14 decreases. As the syrup level decreases, the disk 120 descends within the interior of the filter element 114 toward the valve seat 112 and upon contacting the same, rapidly seats itself upon the valve seat 112 and prevents any air maintained within the filter chamber 110 from traveling across the valve seat 112. Advantageously, the seating of the disk 120 against the valve seat 112 causes the flow to the intake port 40 of the pump 18 to be discontinued wherein continued operation of the pump 18 generates an extremely high vacuum level at the intake port 40 of the pump.

In the preferred embodiment, the vacuum level rises to a value approximately 25 inches of mercury which thereby provides a sufficiently large pressure differential between normal syrup pumping and non-pumping conditions wherein a conventional pressure switch 150 (shown in FIG. 1) disposed between the outlet port 106 of the air trap/filter 14 and intake port 40 of the pump 18 may be utilized to automatically discontinue the pump operation. Thus, the air trap 14 prevents any overheating of the pump 18 or inaccurate delivery of syrup through the pump 18.

To reset the air trap/filter 14 such as subsequent to replacing the spent syrup reservoir 12A or remove the ingested air from the air trap/filter 14, an operator (not shown) may depress a valve stem 130 disposed adjacent the upper end of the cap 102 causing a passageway 132 to be selectively opened between the filter chamber 110 and atmosphere and vent the air trapped within the filter chamber 110. Due to the air trap 14 being installed at a vertical elevation below the syrup reservoir 12A or 12B, during this venting procedure, the syrup from the reservoir 12A or 12B will travel by gravity force through the inlet port 104 and begin refilling the filter chamber 110. To permit equalization of pressure between the outlet port 106 and filter chamber 110, after refilling of the chamber 110, a plunger rod 134 disposed along the lowermost surface of the body 100 of the air trap/filter 14 may be manually depressed causing the plunger 134 to contact the disk 120 and urge the same off the valve seat 112. As will be recognized, once moved off the seat 112, the disk 120 will immediately rise upward to the new fluid level within the filter chamber 110, and thereby permit re-initiation of syrup flow across the valve seat 112 and into the discharge port 106. A pressure switch reset (not shown) may subsequently be activated to cause the pump 18 to reinitiate its pumping operation. As an alternative means to the plunger pin 134, a small orifice 140 may be provided between the outlet port 106 and filter chamber 110 which permits the pressure values within the outlet port 106 and filter chamber 110 to slowly equalize after refilling of the filter chamber 110. Thus, it will be recognized that by use of the air trap/filter 14 of the present invention, air ingestion into the pumping system is eliminated which prevents any overheating of the pump 18 or inaccurate syrup delivery to the mixing nozzle 20.

Figure 7:
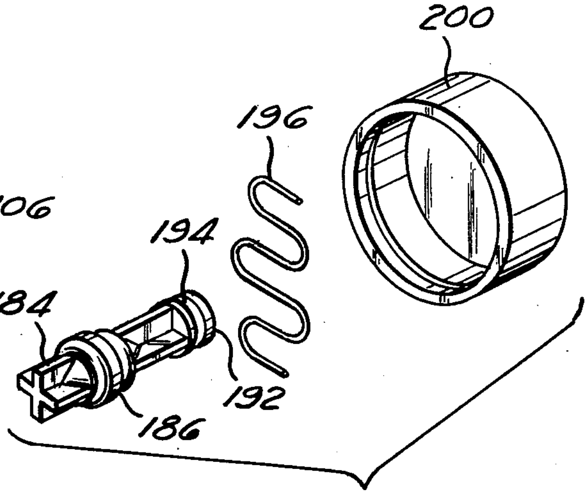
FIG. 7 is an enlarged exploded view of the valving member and overcenter latching spring of the diverter valve of FIG. 6.
Figure 6:
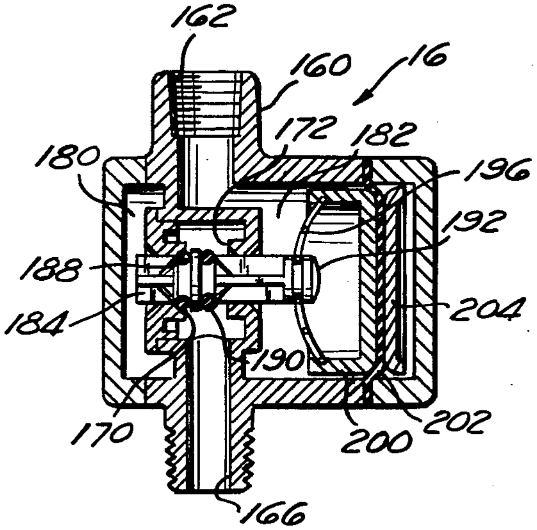
FIG. 6 is a cross-sectional view of the diverter valve of the present invention taken about lines 6—6 of FIG. 3.

To augment the air ingestion features made possible by the air trap/filter 14, the present invention additionally incorporates a novel diverter valve 16 which as depicted in FIG. 1, is disposed between the pump 18 and the pair of air trap/filters 14A and 14B to permit the automatic switching between the plural syrup bag reservoirs 12A and 12B. As shown in FIGS. 3, 6, and 7, the diverter valve 16 is formed having a valve body 160 including a pair of inlet ports 162 and 164 and a discharge port 166. In the composite apparatus 10 of the present invention, the inlet ports 162 and 164 are connected to the air traps/filters 14A and 14B, respectively, while the discharge port 166 of the diverter valve 16 is in flow communication with the inlet port 40 of the pump 18.

As best shown in FIG. 6, the outlet port 166 of the diverter valve 16, extends within the interior of the valve body 160 terminating in an annular valve chamber 168. A pair of frustro-conical shaped valve seats 170 and 172 are provided on opposite walls of the valve chamber 168. The internal wall construction of the valve body 160 is formed such that the inlet port 164 is in constant flow communication with the flow passage 180 disposed on the left hand side of the valve chamber 168 (as viewed in FIG. 6) while the inlet port 162 is in constant flow communication with the flow passage 180 disposed on the right hand side of the valve chamber 168. As such, it will be recognized that flow through the inlet port 162 to the outlet port 166 is provided exclusively through the flow passage 182 and across the valve seat 172 while flow from the inlet port 164 to the outlet port 166 is provided exclusively through the flow passage 180 and across the valve seat 170.

A valving member or poppet 184 is coaxially positioned within both of the valve seats 170 and 172 and is formed having an effective outside diameter sized slightly less than the minimum diameter of the valve seats 170 and 172 to permit the poppet 184 to be reciprocated axially therein. The poppet 184 is preferably formed having a generally cross-shaped cross-sectional configuration and includes an enlarged central annular flange 186 sized to have a diameter greater than the diameter of the valve seats 170 and 172. A pair of O-rings 188 and 190 (for illustration purposes, only shown in FIGS. 6, 9, and 10) are mounted on opposite sides of the flange 186 and are sized to provide a fluid tight seal against the valve seats 170 and 172, respectively.

The distal end of the poppet 184 terminates in an enlarged diameter section 192 which includes a circumferential groove 194. The groove 194 is sized to frictionally engage and capture the central portion of an over-center latching spring 196 which is typically formed of stainless spring steel stock. The distal ends of the spring 196 are affixed to a piston 200 disposed within the distal portion of the flow chamber 182. A diaphragm 202 extends across the flow chamber 182 and is affixed to the distal planer surface of the piston 200 as by way of a mounting plate 204 (shown only in FIG. 6). The piston 200 is formed to have an outside diameter slightly less than the diameter of the flow passage 182 so as to be capable of reciprocating axially within the flow passage 182. An annular chamber 206 is additionally provided adjacent the opposite end of the housing 160 and is in flow communication to the flow passage 180 and, hence, the inlet port 164. As such, it will be recognized that the diaphragm 202 and piston 200 are constantly exposed on their left hand side (as viewed in FIG. 6) to fluid or syrup pressure existing within the inlet port 162 while on the right hand side, to fluid pressure existing in the inlet port 164.

Figure 8:
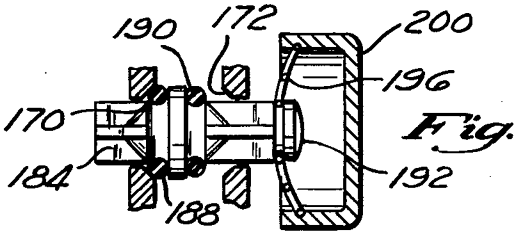
FIG. 8 is a cross-sectional schematic view of the valving member of FIG. 7 disposed against one of the valve seats of the diverter valve.
Figure 9:
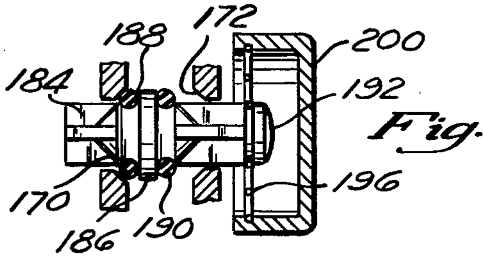
FIG. 9 is a cross-sectional schematic view of the valving member of FIG. 7 disposed against one of the valve seats of the diverter valve at a moment of time just prior to actuation of the valving member to the other valve seat of the diverter valve.
Figure 10:
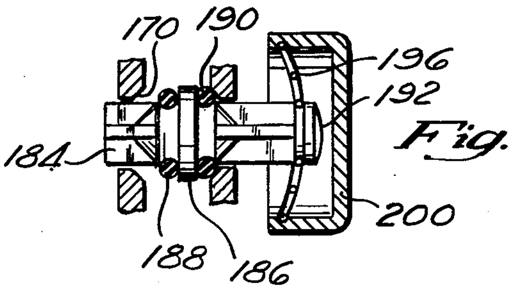
FIG. 10 is a cross-sectional schematic view of the valving member of FIG. 7 disposed against the other valve seat of the diverter valve.

In FIGS. 8, 9, and 10, the operation of the diverter valve 16 of the present invention is depicted. For purposes of explanation, only the piston 200, over latching springs 196, poppet 184, and valve seats 170 and 172 are illustrated. However, it will be recognized that the remaining structure of the diverter valve 16 and its connection into the apparatus 10 of the present invention is to be assumed. In its initial operating position, the poppet 184 is biased by the spring 196 to a position wherein the O-ring 188 firmly contacts and seals against the valve seat 170 thereby preventing syrup flow through the inlet port 162 to the outlet port 166. However, in this initial position, the O-ring 190 of the poppet 184 is spaced from the valve seat 172 such that syrup flow from the inlet port 162 and flow passage 182 may travel about the poppet 184, across the valve seat 172 and into the discharge port 166. Thus, the quantity of syrup 22A maintained within the collapsible bag storage reservoir 12A, may pass freely through the diverter valve 16 while the quantity of syrup 22B maintained within the collapsible bag reservoir 12B is valved or isolated from the pump 18 by the diverter valve 16. During this initial flow situation across the valve seat 172, it will be recognized that the pressure existing on opposite sides of the piston 200 is substantially equal and, hence, the piston remains in its position indicated in FIG. 8.

The flow across the valve seat 172 continues until such time as the entire quantity of syrup 22A is depleneished from the reservoir 12A or alternatively, upon the sensing of air ingestion into the air trap/filter 14A in a manner previously described, both of which conditions cause a high vacuum level to be applied to the left side of the diaphragm 200. The high vacuum level sensed on the left hand side of the diaphragm 200 causes the piston 200 and diaphragm 202 to move axially from right to left from their initial position indicated in FIG. 8 to a subsequent position indicated in FIG. 9. This movement of the piston 200 overcomes the biasing force of the spring 196 causing the spring to gradually return from its concave configuration depicted in FIG. 8 to a substantially straight configuration indicated in FIG. 9. However, due to the spring 196 maintaining its biasing force as the piston 200 moves from right to left, during this straightening motion of the spring 196, the O-ring 188 remain firmly seated against the valve seat 170 to prohibit any fluid-flow from the inlet port 164 through the diverter valve 16.

The over center latching spring 196 is formed to be inherently unstable in this straight configuration position indicated in FIG. 9 and as such, any further continued movement of the piston 200 from right to left will cause the over-center latching spring to rapidly snap over center and move to a convex configuration as indicated in FIG. 10. Once snapped over center, the spring 196 drives the poppet 184 off the valve seat 170 causing the O-ring 190 to tightly contact and seal against the valve seat 172 as indicated in FIG. 10. With the poppet 184 located in this position (as depicted in FIG. 10), the O-ring 188 has moved off the valve seat 170 and, hence, syrup may flow from the reservoir 12B, through the inlet port 164 of the diverter 16, across the valve seat 170 and into the outlet 166. Due to the syrup pressure within the intlet port 164 being disposed on the right hand side of the piston 200 and the previously obtained vacuum level existing on the left hand side of the piston 200, the poppet 184 will be retained in this position to permit continuous flow of syrup through the inlet port 164 to the outlet port 166.

After the poppet 184 has traveled off the valve seat 170 and unto the valve seat 172, an operator (not shown) may replace the previously depleted collapsible bag container 12A in a manner previously described without interfering with the syrup flow from the other collapsible bag syrup container 12B to the pump 18. In those instances however, where the operator fails to replace the depleted bag 12A and the second syrup bag 12B becomes spent, a high vacuum signal is applied to the right hand side of the poppet 120 as viewed in FIG. 10. However, due to the high vacuum signal being disposed on both sides of the piston 20, the piston will remain in its position shown in FIG. 10 keeping the poppet 184 tightly seated against the valve seat 172. Thus, in this event, syrup flow through the diverter 16 and to the intake port of the pump 18 will be discontinued, wherein a high vacuum signal will be applied to the pressure switch 150 located adjacent the inlet port 40 of the pump 18 causing the motor 68 of the pump 18 to automatically shut off. To eliminate any premature shut off of the pump motor 18 prior to the shifting of the poppet 184, it will be recognized that spring constant of the biasing spring 196 is sized to permit the overcenter snapping action of the spring 196 prior to encountering a vacuum signal sufficiently great to cause actuation of the pressure switch 150.

Thus, it will be recognized that the present invention comprises an improved method and apparatus of dispensing syrup which specifically addresses and alleviates the air ingestion and syrup container change over deficiencies heretofore associated in the prior art. Although in the preferred embodiment certain materials and part configuration have been defined, those skilled in the art will recognize that variations to the same can be made and such variations and modifications are contemplated within the spirit of the present invention.

What is claimed is:

1. An improved beverage syrup dispensing apparatus comprising:
- a reservoir adapted to store a quantity of beverage syrup;
- a nozzle formed to dispense said quantity of said beverage syrup with a proportional quantity of a beverage mixing fluid;
- a pump disposed between said reservoir and said nozzle for delivering said quantity of syrup from said reservoir to said nozzle;
- means disposed between said reservoir and said pump for detecting the presence of air in said quantity of syrup;
- said detecting means comprises a valve including a valve seat and valving member, said valving member adapted to remain spaced from said valve seat when said quantity of syrup is present in said valve to permit said quantity of syrup to flow across said valve seat and contact said valve seat when said quantity of syrup is not present in said valve to prevent any flow of air across said valve; and
- switching means responsive to said detecting means for automatically discontinuing the operation of said pump upon the detection of air in said quantity of syrup.

2. An improved beverage syrup dispensing apparatus comprising:
- a pair of reservoirs each adapted to store a quantity of beverage syrup;
- a nozzle formed to dispense said quantity of syrup from said pair of reservoirs with a proportional quantity of beverage mixing fluid;
- a pump disposed between said pair of reservoirs and said nozzle for delivering said quantity of syrup from said pair of reservoirs to said nozzle;
- means disposed between each of said reservoirs and said pump for detecting the presence of air in said quantity of syrup and the depletion of said quantity of syrup in each of said pair of reservoirs; and
- means responsive to said detecting means for placing said pump in flow communication with only one of said pair of reservoirs and automatically placing said pump in flow communication with the other one of said pair of reservoirs upon the detection of the presence of air and the depletion of said quantity of syrup in said one of said pair of reservoirs;
- said placing means comprising a valve disposed between said pump and said detecting means, said valve including a pair of valve seats each in flow communication with one of said pair of detecting means, and a valve member reciprocable between said pair of valve seats to permit flow across only one of said pair of valve seats.

3. The apparatus of claim 1 wherein said valve is sized to establish a varying syrup level within said valve and said valving member is adapted to float upon said syrup level.

4. The apparatus of claim 3 wherein said valve additionally includes means for filtering said quantity of syrup prior to flow across said valve seat.

5. The apparatus of claim 4 wherein said switching means comprises a pressure switch connected between said pump and said valve.

6. The apparatus of claim 5 wherein said pump comprises a short stroke low flow rate pump.

7. The apparatus of claim 6 wherein said reservoir comprises a collapsible bag/box container.

8. The apparatus of claim 2 wherein said valve member is actuated between said pair of valve seats by an over-center latching spring disposed within said valve.

9. The apparatus of claim 8 wherein said over-center latching spring is adapted to bias said valve member against one of said pair of valve seats except during reciprocation of said valving member between said pair of valve seats.

10. The apparatus of claim 9 wherein said valve member comprises a poppet having an enlarged central portion sized to seal against said pair of valve seats.

11. The apparatus of claim 10 wherein said pump comprises a low flow rate pump.

12. A method of dispensing a beverage syrup comprising the steps of:
- storing a quantity of beverage syrup in a pair of reservoirs;
- initially pumping said quantity of syrup from one of said pair of reservoir to a nozzle adapted to dispense said syrup with a proportional quantity of a mixing fluid;
- sensing the presence of air and depletion of said syrup within said quantity of syrup prior to pumping said syrup to said nozzle;
- generating a vacuum signal in response to sensing the presence of air and depletion of said syrup within said quantity of syrup; and
- discontinuing the pumping of said fluid in response to sensing the presence of air within said syrup to prevent air from being dispensed through said nozzle; and
- subsequently pumping said quantity of syrup from other one of said pair of reservoirs in response to detecting said vacuum signal.

13. The method of claim 12 further comprising the step of alternating said pumping of syrup from said one and said other one of said reservoirs in response to detecting said vacuum signal.

14. In a syrup dispensing apparatus having a first and second syrup reservoirs, a dispensing nozzle and a pump formed to deliver syrup from each of said reservoirs to said nozzle, the improvement comprising:

a valve disposed between said first and second reservoirs and said pump, said valve having a first inlet communicating with first reservoir, a second in communicating with said second reservoir, a common outlet communicating with said pump, a first valve seat disposed between said first inlet and said outlet, a second valve seat disposed between said second inlet and said outlet, a valving member positioned for movement between said first and said second valve seat and driving means for moving said valving member between said first and second valve seat in response to detection of a pre-determined pressure differential existing between said first and second inlet.

15. The apparatus of claim 14 wherein said driving means comprises a piston apparatus to said valving member, one side of said piston being in flow communication with said first inlet and the other side of said piston being in flow communication with said second inlet, said piston adapted for reciprocable movement in response to the pressure differential existing across said piston.

16. The apparatus of claim 15 wherein said piston is connected to said valving member by an over-center latching spring having a first position adapted to bias said valving member against said first valve seat, a second position adapted to bias said valving member against said second valve seat and a third unstable position during movement between said first and second positions.

17. The apparatus of claim 16 wherein reciprocable movement of said piston causes said latching spring to move from said first to said second position.

* * * * *